(12) United States Patent
Wu

(10) Patent No.: US 6,675,481 B2
(45) Date of Patent: Jan. 13, 2004

(54) GARDENING SHEARS STRUCTURE

(76) Inventor: Shyh-Piao Wu, 220, Lu Ho Road Sec. 1, Lu Kang Town, Changhua (TW)

( * ) Notice: Subject to any disclaimer, the term of this patent is extended or adjusted under 35 U.S.C. 154(b) by 8 days.

(21) Appl. No.: 10/106,027

(22) Filed: Mar. 27, 2002

(65) Prior Publication Data

US 2003/0159292 A1 Aug. 28, 2003

(30) Foreign Application Priority Data

Feb. 27, 2002  (TW) ...................................... 91202305 U

(51) Int. Cl.[7] ........................... B26B 11/00; B26B 13/00
(52) U.S. Cl. ....................................... 30/123.3; 30/262
(58) Field of Search ........................... 30/1, 123, 123.3, 30/124, 125, 132, 254, 262

(56) References Cited

U.S. PATENT DOCUMENTS

| | | | | |
|---|---|---|---|---|
| 1,161,889 A | * | 11/1915 | Rothholz | .................... 30/123.3 |
| 4,567,656 A | * | 2/1986 | Wallace et al. | ................ 30/262 |
| 4,783,907 A | * | 11/1988 | Ravaux | ...................... 30/123.3 |
| 2002/0017025 A1 | * | 2/2002 | Lindermeir | .................. 30/135 |
| 2003/0014868 A1 | * | 1/2003 | Cech et al. | ................ 30/296.1 |

* cited by examiner

Primary Examiner—Hwei-Siu Payer
(74) Attorney, Agent, or Firm—Rabin & Berdo, P.C.

(57) ABSTRACT

A gardening shears structure in which one handgrip has a circular recess sealed by a rotary plug. The rotary plug has a knob at the top that facilitates minimal force rotation during extrication, with a spring situated inside the circular recess enabling the smooth removal of the rotary plug, and a pliant body permeated with oil is inserted into a hollow sleeve at the bottom of the rotary plug such that it is partially exposed. After flower and branch cutting, a physically-worn or hand-carried cloth serves as a means of simple cleaning and following the wiping away of sap, leaf fragments, soil, and other grimy matter on the two blades of the truncating section, the oil permeating the pliant body is applied to shield them from air exposure to prevent corrosion and lubrication, thereby achieving the objective of maintenance.

3 Claims, 4 Drawing Sheets

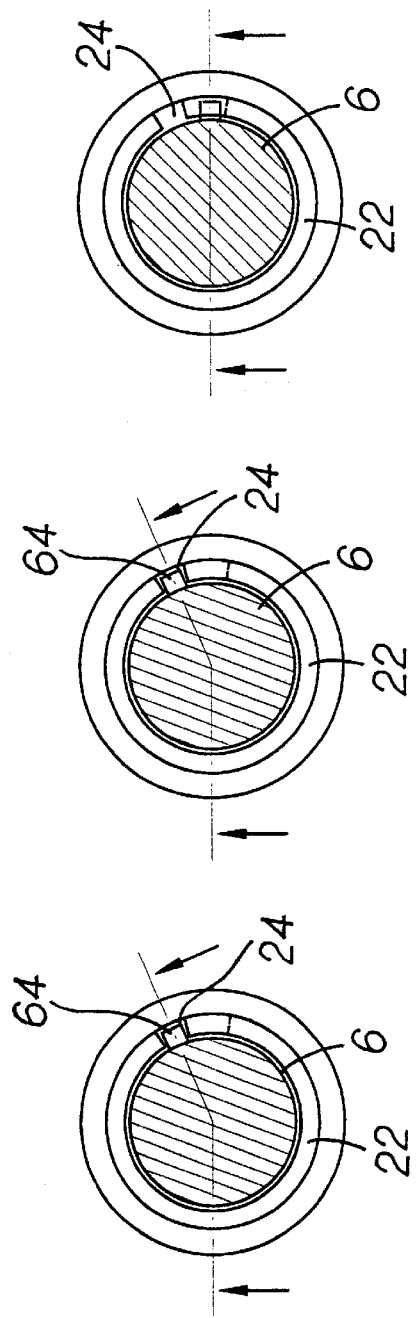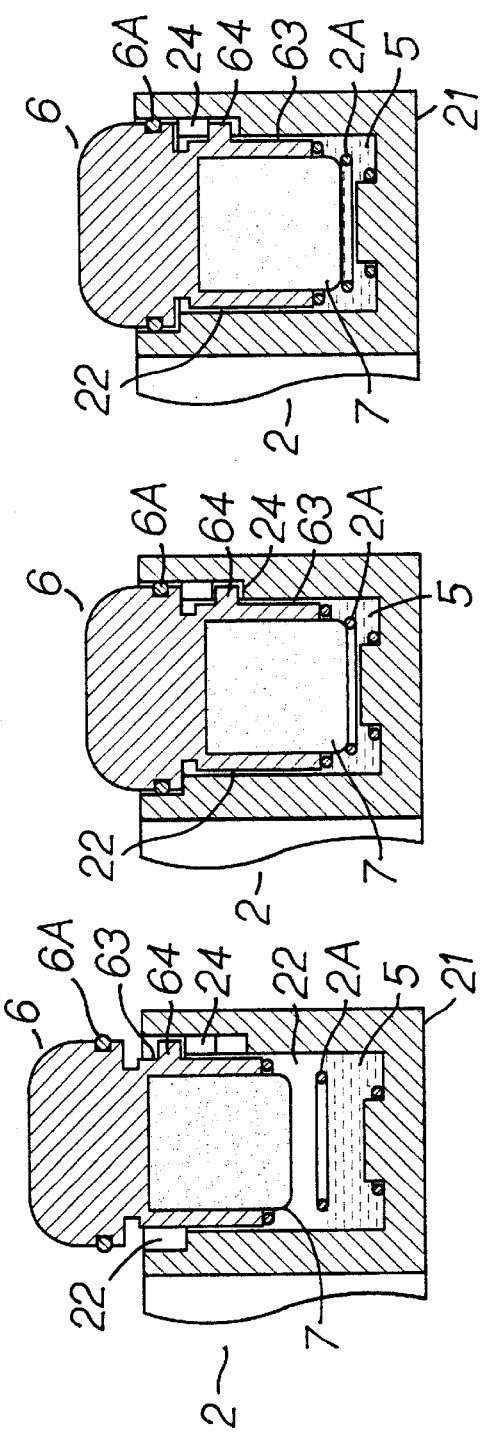

GARDENING SHEARS STRUCTURE

BACKGROUND OF THE INVENTION

1) Field of the Invention

The invention herein relates to a gardening shears structure in which the handgrip of the garden shears has an inserted rotary plug containing a pliant body permeated with maintenance oil that is utilized to apply the maintenance oil over the entire garden shears, isolating it from external air exposure to prevent corrosion and provide lubrication, and thereby achieving the objective of maintenance.

2) Description of the Prior Art

In the utilization of various conventional gardening shears structures on the market, after the respectively aligned two blades of the truncating section at the front end of the handle section of the gardening shears are utilized to trim garden flowers and plants for the purpose of maintaining their attractiveness and neatness, beautifying the environment and thereby settling the body and mind, garden flower and plant sap, leaf fragments, soil, and other grimy matter clinging to the two blades of the said truncating section are cleaned off to preserve the mechanical integrity and cleanliness of the gardening shears, thereby facilitating the storage of the gardening shears and providing for the next instance of usage.

However, when the gardening shears are cleaned after trimming garden flowers and plants, a physically-worn or hand-carried cloth is usually put to use as a convenient means of simple cleaning and following the wiping away of garden plant sap, leaf fragments, soil, and other grimy matter on the two blades of the truncating section, the gardening shears is placed in storage until the next time it is needed.

At the completion of the said simple means of cleaning, there is still a greater or lesser presence of moisture remaining on the gardening shears which leads to the occurrence of changes after a certain period of time and air exposure, including the extremely easy onset of corrosion on the gardening shears. In addition to being quite unsightly, if the corrosion is excessive, this can result in the jamming of the gardening shears, rendering it incapable of normal operation and resulting in numerous other utilization inconveniences. Furthermore, removal of corrosion from the gardening shears is difficult. Corrosion of the two blades of the truncating section due to effects of moisture adversely affects the sharpness of the two blades and causes a rough action when trimming garden flowers and plants which is highly inconvenient in that the gardening shears will be incapable of efficiently achieving the attractiveness and neatness enjoyed after garden flower and plant trimming, significantly reducing environmental beautification as well as the settling of the body and mind.

In view of the existent shortcomings of the said conventional structure, the inventor of the invention herein conceived of original improvements based on many years of experience in the relevant technology that culminated in successful development of an improved structure capable of enhanced performance, which is hereby submitted as a new patent application.

SUMMARY OF THE INVENTION

The primary objective of the invention herein is to provide an improved structure gardening shears in which the handgrip of the garden shears has an inserted rotary plug containing a pliant body permeated with maintenance oil that is utilized to apply the maintenance oil over the entire garden shears to isolate them from external air exposure, which not only prevents the development of corrosion on the gardening shears, but protects their original attractive appearance and, furthermore, precludes the extreme corrosion that results in mechanical seizure, disabled normal operation, and other numerous utilization inconveniences as well as the troublesome need to remove rust on the garden shears and since corrosion does not occur on the two blades of the truncating section, the sharpness of the two blades is preserved to facilitate flower and branch cutting efficiency and convenience, enabling attractive and neat garden flower and plant trimming that beautifies the environment and settles the body and the mind.

To provide for the examination and reference of the structural features, operation, and other items of the present invention, the brief description of the drawings below is followed by the detailed description of the invention herein.

BRIEF DESCRIPTION OF THE DRAWINGS

FIG. 1-B is an exploded drawing of the invention herein.

FIG. 4-A is a partial cross-sectional drawing of the invention herein, as viewed from a distal perspective. (1)

FIG. 4-B is a partial cross-sectional drawing of the invention herein, as viewed from a lateral perspective. (1)

FIG. 5-A is a partial cross-sectional drawing of the invention herein, as viewed from a distal perspective. (2)

FIG. 5-B is a partial cross-sectional drawing of the invention herein, as viewed from a lateral perspective. (2)

FIG. 6-A is a partial cross-sectional drawing of the invention herein, as viewed from a distal perspective. (3)

FIG. 6-B is a partial cross-sectional drawing of the invention herein, as viewed from a lateral perspective. (3)

DETAILED DESCRIPTION OF THE INVENTION

Figure 1:
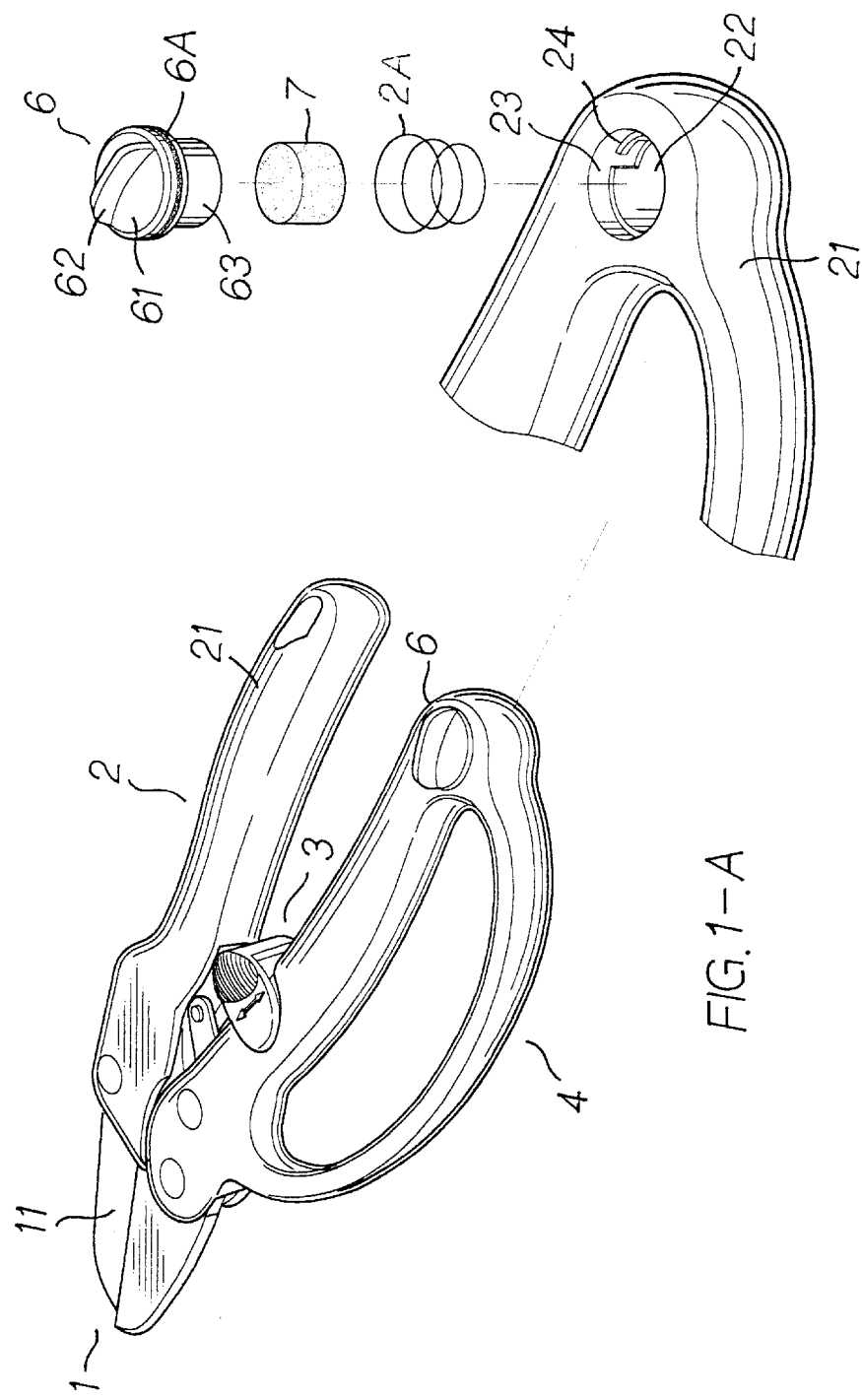
FIG. 1-A is an isometric drawing of the invention herein.
Figure 2:
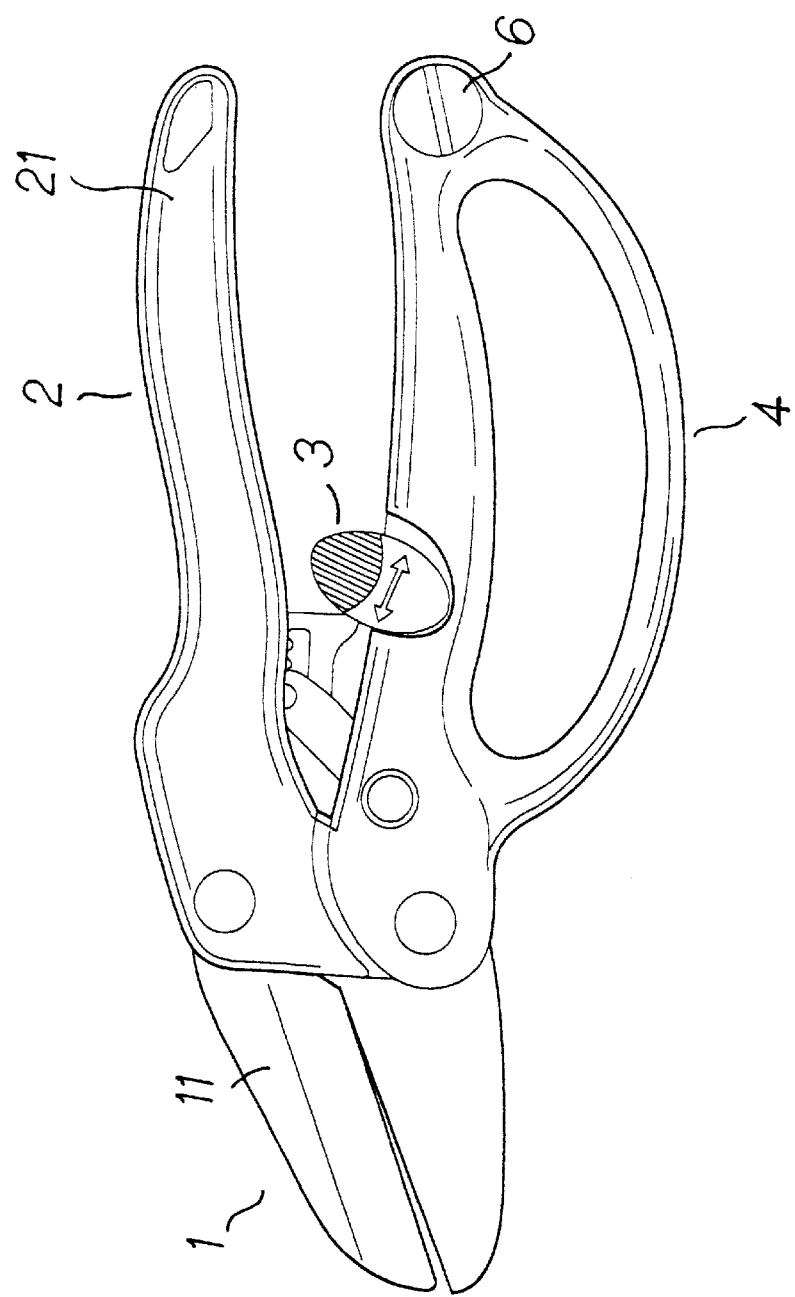
FIG. 2 is an orthographic drawing of the invention herein.
Figure 3:
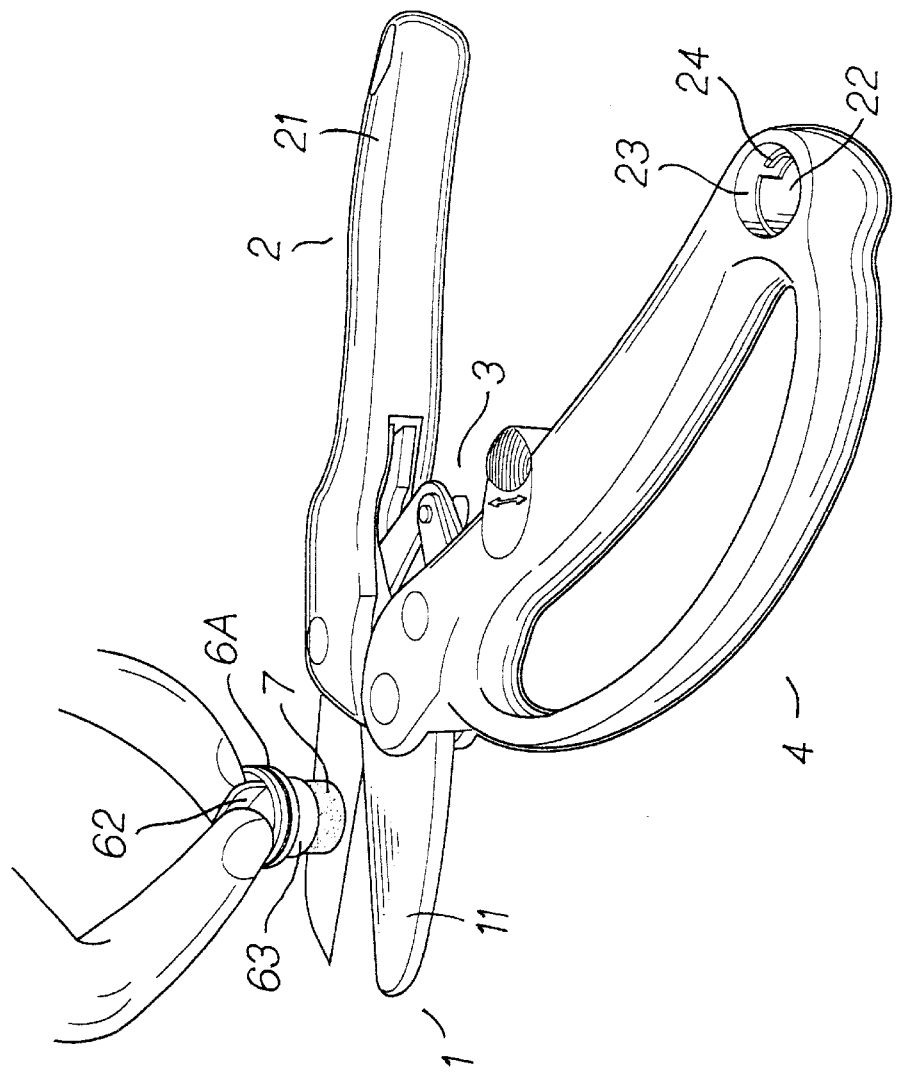
FIG. 3 is an isometric drawing of an embodiment of the invention herein.

Referring to FIG. 1-A, FIG. 1-B, FIG. 2, and FIG. 3, the gardening shears structure of the invention herein is comprised of:

A truncating section (i.e.. the section that cuts the plants) 1 consisting of two blades 11 and, furthermore, fastened at the rear and fixed to the front end of a handle section 2.

A handle section 2 consisting of two handgrips 21; a locking mechanism 3 between their two aligned inner sides that keeps the garden shears 4 opened or closed; a circular recess 22 sunken into the wider surface at the end of one handgrip 21 that provides for the containing of an upkeep-use, pliant body 7 permeated with maintenance oil 5; a rotary plug 6 seals the opening of the circular recess 22 and prevents the exudation of the maintenance oil 5, the rotary plug 6 having a leak-proof ring 6A around its head extremity 61 with seep impediment properties, a knob 62 rising from the top surface of the head extremity 61 that facilitates insertion and removal from the recess 22 opening, a hollow annular sleeve 63 extending from the bottom edge of the rotary plug 6 which holds the pliant body 7 such that it is exposed and insertable into the recess 22 opening along with the rotary plug 6; a spring 2A situated against the inside of the recess 22; and an L-shaped indentation 24 formed in the inner wall surface 23 of the recess 22 that enables the insertion and latching of a projecting member 64 emerging from the outer cylindrical surface of the hollow annular sleeve 63.

Referring to FIG. 4-A, FIG. 4-B, FIG. 5-A, FIG. 5-B, FIG. 6-A, and FIG. 6-B, following the placement of the hollow annular sleeve 63 extending from the rotary plug 6 into the recess 22 opening, the projecting member 64 of the outer cylindrical surface of the hollow annular sleeve 63 is first inserted such that it is oriented in the same entry direction as the long extremity of the L-shaped indentation 24 and while being slid into the recess 22, the exposed pliant body 7 held in the hollow annular sleeve 63 contacts and presses downward against the spring 2A at the bottom section of the recess 22 until the projecting element 64 slides down to the bottom portion of the long extremity, following which the rotary plug 6 is rotated to revolve the hollow annular sleeve 63, causing the projecting member 64 at the outer cylindrical surface of the hollow annular sleeve 63 to exit the bottom portion of the long extremity and become oriented in a different direction to enter and engage the short extremity and thereby enable the rotational securing of the rotary plug 6 into the recess 22.

Conversely, to remove the rotary plug 6 rotationally secured in the recess 22, the rotary plug 6 is turned in the opposite direction to pivot the projecting member 64 engaged in the short extremity to the long extremity such that the projecting member 64 is no longer under the restraint of the short extremity and, at the same time, capable of sliding upward in the L-shaped indentation 24 and, furthermore, the rebound action of the spring 2A compressed and contacted by the hollow annular sleeve 63 pliant body 7 facilitates the smooth removal of the entire rotary plug 6 and hollow annular sleeve 63 from the recess 22 and precludes the occurrence of difficult removal.

When the gardening shears 4 are cleaned after flower and branch cutting, a physically-worn or hand-carried cloth is used as a convenient means of simple cleaning and following the wiping away of garden plant sap, leaf fragments, soil, and other grimy matter on the two blades 11 of the truncating section 1, the rotary plug 6 tightened within the circular recess 22 in one handgrip 21 of the gardening shears 4 is conveniently removed, with the knob 62 at the top surface of the head extremity 61 facilitating the minimal force rotation of the entire rotary plug 6 and extrication from the recess opening 22, following which the maintenance oil 5 permeating the exposed pliant body 7 ensconced in the hollow annular sleeve 63 is applied onto the entire gardening shears 4 to isolate it from external air exposure to prevent corrosion and provide lubrication, thereby achieving the objective of maintenance.

As such, after the gardening shears 4 are exposed to air for a period of time, the application of maintenance oil 5 shields them from direct air exposure and the occurrence of changes, not only preventing the development of corrosion on the gardening shears 4, but protecting their original attractive appearance and, furthermore, precluding the extreme corrosion that results in jamming, disabled normal operation, and other numerous utilization inconveniences as well as the troublesome removal of rust on the garden shears 4 and since corrosion does not occur on the two blades 11 of the truncating section 1, the sharpness of the two blades 11 is preserved to facilitate flower and branch cutting efficiency and convenience, enabling attractive and neat garden flower and plant trimming that beautifies the environment and soothes the body and the mind.

In summation of the foregoing section, since the innovative and improved performance of the invention herein ensures greater user safety and, furthermore, enhanced user operation, the present invention meets the new patent requirement of practicality and is lawfully submitted to the patent bureau for review and the granting of the commensurate patent rights.

I claim:
1. Gardening shears, comprising:
 a truncating section having two blades; and
 a handle section having a front end fastened and fixed to a rear end of said truncating section, said handle section having:
  two handgrips, one of said handgrips having a circular recess sunken into a surface and at an end thereof;
  a locking mechanism disposed between respective inner sides of said handgrips, said locking mechanism maintaining said garden shears opened or closed;
  a pliant body permeated with a maintenance oil, and being contained within the circular recess;
  a rotary plug that seals an opening of the circular recess to prevent an exudation of the maintenance oil, said rotary plug having a head, a leak-proof ring around the head, and which has seep impediment properties, a knob rising from a top surface of the head that facilitates an insertion and removal of said rotary plug from the recess opening, a hollow annular sleeve extending from a bottom edge of said rotary plug which holds said pliant body such that said pliant body is partially exposed and insertable into the recess opening along with said rotary plug, and a projecting member emerging from an outer cylindrical surface of said hollow annular sleeve;
  a spring situated inside of the recess; and
  an L-shaped indentation formed along an inner wall surface of the recess that enables the insertion and latching of the projecting member.
2. Gardening shears, comprising:
 a truncating section having two blades; and
 a handle section having a front end fastened and fixed to a rear end of said truncating section, said handle section having:
  two handgrips, one of said handgrips having a circular recess sunken into a surface and at an end thereof;
  a pliant body permeated with a maintenance oil, and being contained within the circular recess;
  a rotary plug that seals an opening of the circular recess to prevent an exudation of the maintenance oil, said rotary plug having a head, a leak-proof ring around the head, and which has seep impediment properties, a knob rising from a top surface of the head that facilitates an insertion and removal of said rotary plug from the recess opening, a hollow annular sleeve extending from a bottom edge of said rotary plug which holds said pliant body such that said pliant body is partially exposed and insertable into the recess opening along with said rotary plug, and a projecting member emerging from an outer cylindrical surface of said hollow annular sleeve; a spring situated inside of the recess; and
 an L-shaped indentation formed along an inner wall surface of the recess that enables the insertion and latching of the projecting member.
3. A tool, comprising:
 a handle having at least one handgrip, said at least one handgrip having a circular recess formed therein;
 a pliant body permeated with a maintenance oil, and being contained within the circular recess;

a rotary plug that seals an opening of the circular recess to prevent an exudation of the maintenance oil, said rotary plug having a head, a leak-proof ring around the head, and which has seep impediment properties, a knob rising from a top surface of the head that facilitates an insertion and removal of said rotary plug from the recess opening, a hollow annular sleeve extending from a bottom edge of said rotary plug which holds said pliant body such that said pliant body is partially exposed and insertable into the recess opening along with said rotary plug, and a projecting member emerging from an outer cylindrical surface of said hollow annular sleeve;

a spring situated inside of the recess; and an L-shaped indentation formed along an inner wall surface of the recess that enables the insertion and latching of the projecting member.

\* \* \* \* \*